(No Model.)
P. ROHAN.
FEED WATER HEATER.
No. 394,137. Patented Dec. 4, 1888.
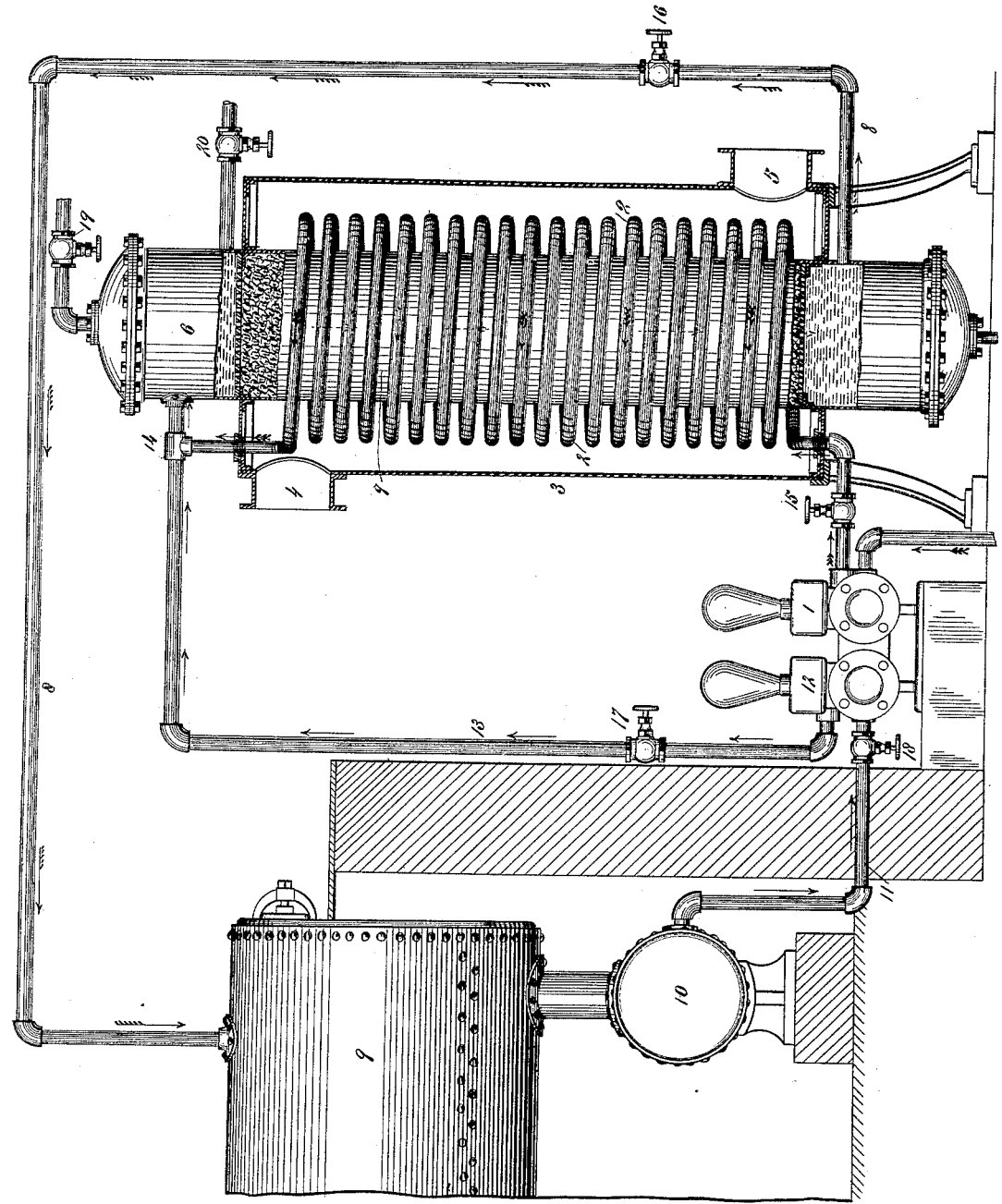
Witnesses:
Charles Pickles,
G. N. Hinchman Jr.
Inventor:
Philip Rohan
By his Attorneys
Fowler & Fowler

UNITED STATES PATENT OFFICE.

PHILIP ROHAN, OF ST. LOUIS, MISSOURI.

FEED-WATER HEATER.

SPECIFICATION forming part of Letters Patent No. 394,137, dated December 4, 1888.

Application filed May 28, 1888. Serial No. 275,344. (No model.)

*To all whom it may concern:*

Be it known that I, PHILIP ROHAN, a citizen of the United States, residing at St. Louis, in the State of Missouri, have invented certain new and useful Improvements in Feed-Water Heaters and Filters, of which the following is such a full, clear, and exact description as will enable any one skilled in the art to which it appertains to make and use the same, reference being had to the accompanying drawing, forming part of this specification.

The object of my invention is to increase the temperature at which feed-water is filtered prior to its delivery to the boiler, and also to refilter the water after it has been introduced into the boiler, and to maintain the temperature of the water drawn from the boiler by exhaust-steam, so that its temperature will not be lowered to such a degree that it will abstract useful heat from the boiler.

The invention also has for its object heating the feed-water by exhaust-steam to effect economy.

I am aware that it is not broadly new to refilter the water after it is delivered to the boiler, and do not claim such as my invention.

The invention consists of a heater which receives its heat from exhaust-steam, through which heater the water is forced by a pump, and is then delivered to a filter located within the heater, through which filter the water passes to the boiler, so that the temperature of the water is maintained while passing through the filter and no heat lost by radiation. At the point where the feed-water is received into said filter a connection is made with the boiler, preferably with the mud-drum thereof, and a second pump-chamber interposed between said mud-drum and the filter, so that the feed-water, after being heated by passing through the coil, encounters the water from the boiler, which heats it very near to boiler temperature before the filtering is accomplished. It will be noted in this connection that, the filter being jacketed and enveloped by the heater, which is supplied with exhaust-steam, the water taken from the boiler is maintained very near its boiler temperature, no great amount of heat being lost by repassing the water through the filter, which feature is an improvement over any refiltering apparatus now in use and constitutes one of the principal points of my invention.

I will describe my invention in detail by referring to the accompanying drawing, in which a portion of a steam-boiler is shown with a heater and filter applied in accordance with my invention.

In an application filed by me on the 17th day of March, 1888, Serial No. 267,451, I have described a filter and heater substantially like the one herein shown; but in the present instance I have made a somewhat different application of said filter and heater.

1 is a pump, which forces the feed-water through a coil of pipe, 2, which is surrounded by a jacket, 3, having ports 4 5, through which exhaust-steam is emitted and discharged. The water passes through the coil 2, and is heated by exhaust-steam to 212°. From said coil it passes into a settling-chamber, 6, which is arranged above the filtering or coke chamber 7, arranged within the coil and surrounded by the jacket 3, so that the temperature of the water while being filtered is maintained by exhaust-steam. The water passes through said coke-chamber and emerges from the filter by means of a pipe, 8, which carries the water to the boiler 9.

The mud-drum 10 of the boiler is connected by a pipe, 11, to a second or hot-water pump, 12, which draws the water from the boiler and forces it through the pipe 13, which joins the coil 2 and passes into the settling-chamber 6 with it. At the point 14 the hot water from the boiler and the heated feed-water commingle and pass into the settling-chamber, taking the course mapped out above. In the drawing the arrows show the direction in which the circulation takes place. I have represented in said drawing the feed-water by arrows having a full barb or tail, and the hot water from the boiler by arrows having no barb, and the commingled feed-water and boiler-water are represented by arrows having but half of a barb, so that the circulation in the different pipes can be easily distinguished in the drawing. When the water from the coil encounters the water from the boiler, it is heated well nigh to boiler temperature. If the pressure in the boiler be one hundred pounds, the commingled feed and boiler water, when it reaches the settling-chamber 6 before being filtered, will be not far from 335°, at which temperature eighty-seven per cent. of the foreign matter in the water is rendered flocculent, and seven per cent. thereof is vaporized, so that by filtering the water at such an increased temperature nearly all of the foreign matter is arrested before passing into the boiler. My invention possesses the advantage of filtering water at such a high temperature, and thereby delivering it to the boiler almost pure, and it has also the further advantage of refiltering the water of the boiler and keeping its temperature from falling materially by exhaust-steam which surrounds the filter, so that should any scale start to form in the boiler, or any matter held in suspension or solution be thrown down after the filtered water (which is almost pure) is delivered to the boiler, it will be redrawn from the boiler and filtered anew. It will be seen, therefore, that boilers provided with my improved heater and filter will run very little chance of being incrusted. Incrustation of boilers, as is well known, greatly diminishes their efficiency, and often causes explosions, or causes boilers to be damaged by the overheating of the plates thereof.

The pumps 1 and 12 are preferably worked by the same steam-cylinder—that is to say, they form a duplex pump. Between the cold-water pump 1 and the coil 3 is placed a cock, 15, by which the amount of feed-water may be regulated.

16 is also a cock located in the pipe 8, by which the supply of water to the boiler is controlled.

17 and 18 are cocks placed on each side of the hot-water pump 12 in the pipes 13 and 11, respectively, so as to regulate the amount of water drawn from the boiler. By closing the cock 15 and opening the cocks 17 and 18, the water of the boiler can be refiltered without being mixed with the feed-water. This might be necessary to be done now and then, so as to set up a strong circulation in the boiler and to refilter the boiler-water rapidly to prevent the formation of any scale in the boiler. An advantage will here be noted in my invention over others, that when so withdrawing the water from the boiler and passing it through the filter I maintain its temperature by means of exhaust-steam, (a waste product,) which effects great economy and practically wastes none of the boiler heat. So, too, by closing the valves 17 and 18 and opening the valve 15, the refiltering can be prevented, if desired, and a greater quantity of feed-water supplied to the boiler. By adjusting these valves the quantity of cold and hot water circulating in the apparatus can be regulated at will.

19 is a valve, which is connected to the upper part of the settling-chamber 6, by which the scum may be blown off of the water.

20 is a blow-off cock, which is used to blow off the sediment from the settling-chamber 6.

It will be noted that when the exhaust-steam comes in contact with the cold-water coil 2 the steam will be condensed and the back-pressure on the engine will be relieved, so that the double purpose of heating the feed-water and relieving the back-pressure is subserved.

It will be obvious to those skilled in the art that various changes may be made and still be within the scope of my invention. I do not, therefore, wish to confine myself to the exact arrangement and position of parts described.

What I desire to claim and secure by Letters Patent of the United States as my invention is—

1. The combination, to form a feed-water heating and filtering apparatus, of a coil of pipe through which the feed-water is forced, a heater therefor supplied by exhaust-steam, a settling-chamber and filter into which said coil opens, a hot-water connection from the boiler to said settling-chamber, through which water is drawn from the boiler and forced into said settling-chamber, and a pipe connecting the other end of said filter with the boiler, whereby the feed-water is heated before coming in contact with the water drawn from the boiler, and the commingled water is filtered at its highest temperature before it is delivered to the boiler, for the purpose described.

2. The combination of a coil of pipe through which feed-water is forced, a jacket, 3, surrounding the same, into which exhaust-steam is admitted to heat the feed-water circulating in said coil, a filtering-chamber, to which said coil is connected, located within said coil and jacket, a hot-water connection with the boiler, through which hot water is drawn from the boiler and delivered to said filter, and a pipe connecting the other end of said filter with the boiler, whereby the feed-water is heated before coming in contact with the water drawn from the boiler, and the commingled water is filtered at its highest temperature, and the temperature thereof is maintained while passing through the filter, for the purpose described.

3. A feed-water heater consisting of a coil of pipe, a cold-water pump for forcing the feed-water through said coil of pipe into the boiler, and a jacket surrounding said coil of pipe, into which exhaust-steam from the engine is discharged, whereby the feed-water is heated by said exhaust-steam and the back-pressure of the engine is relieved by the condensation caused by said coil of pipe.

4. The combination, as hereinbefore set forth, of the boiler, as 9, the pipe 11, connected with its mud-drum, a duplex pump having a hot-water chamber, by which the water is drawn from the boiler through said pipe 11, a pipe, 13, connected with the hot-water chamber of said pump and leading to settling-chamber 6, a feed-water pipe, a cold-water chamber of said duplex pump forcing said feed-water through the coil of pipe, as 2, also connected to the settling-chamber 6, a jacket, 3, surrounding said coil of pipe, into which exhaust-steam is discharged, a filter surrounded by said coil and jacket located below said settling-chamber, and a boiler-connecting pipe, 8, opening into the other end of said filter.

5. The combination, as hereinbefore set forth, of the boiler, as 9, a pipe, 11, connected with its mud-drum, a duplex pump having a hot-water chamber, by which the water is drawn from the boiler through said pipe 11, a pipe, 13, connected with the hot-water chamber of said pump and leading to a settling-chamber, 6, a feed-water pipe, a cold-water chamber of said duplex pump forcing said feed-water through a coil of pipe, as 2, connected to the settling-chamber 6, a jacket, 3, surrounding said coil of pipe, into which exhaust-steam is discharged, a filter surrounded by said coil and jacket located below said settling-chamber, a boiler-connecting pipe, 8, opening into the other end of said filter, and the cocks 15, 16, 17, and 18, located in said pipes, as described.

In testimony whereof I have hereunto set my hand and affixed my seal this 26th day of May, 1888, in presence of the two subscribing witnesses.

PHILIP ROHAN. [L. S.]

Witnesses:
A. C. FOWLER,
M. S. REEDER.